United States Patent [19]

Maska et al.

[11] 4,008,293
[45] Feb. 15, 1977

[54] CROSSLINKABLE COATING COMPOSITIONS AND METHOD OF USING THE SAME

[75] Inventors: Rudolf Maska, Pittsburgh; Donald P. Hart, Allison Park, both of Pa.

[73] Assignee: PPG Industries, Inc., Pittsburgh, Pa.

[22] Filed: Aug. 1, 1974

[21] Appl. No.: 493,798

[52] U.S. Cl. .............................. 260/856; 204/181; 260/79.7; 260/851; 260/855; 427/385 R; 427/388 B; 526/303

[51] Int. Cl.² .................. C08L 61/26; C08F 20/58

[58] Field of Search ........................... 260/851, 856

[56] References Cited

UNITED STATES PATENTS

| 3,377,249 | 4/1968 | Marco | 260/856 |
|---|---|---|---|
| 3,405,003 | 10/1968 | DePaolo et al. | 260/851 |
| 3,711,449 | 1/1973 | Brendley | 260/851 |
| 3,717,687 | 2/1973 | Shanley et al. | 260/856 |
| 3,798,193 | 3/1974 | Parekh et al. | 260/851 |

FOREIGN PATENTS OR APPLICATIONS

| 2,236,897 | 0000 | France |
| 1,225,955 | 0000 | France |
| 4,723,429 | 0000 | Japan |

*Primary Examiner*—John C. Bleutge
*Attorney, Agent, or Firm*—George D. Morris

[57] ABSTRACT

Acrylamidoalkanesulfonic acids and their amine and ammonium salts are interpolymerized with other ethylenically unsaturated monomers including at least one such monomer which has at least one site for linking with an aminoplast resin. The interpolymer is admixed with an aminoplast resin to form a crosslinkable coating composition. The presence of the above sulfonic acids or sulfonates catalyzes the crosslinking reaction during baking and remains a part of the interpolymer.

12 Claims, No Drawings

CROSSLINKABLE COATING COMPOSITIONS AND METHOD OF USING THE SAME

Thermoplastic addition polymers are often provided with sites for crosslinking with an aminoplast resin. Such sites contain a labile hydrogen and include hydroxy, carboxy, carbamyl, primary amino, secondary amino, imino and mercapto groups. Hydroxy, carboxy or both are most often employed. The preferred crosslinking site is the hydroxy group.

It is customary, although not strictly necessary, for the thermoplastic addition polymer to contain some carboxy groups, although the majority of other crosslinking sites are of a different identity. The carboxy groups make the thermoplastic addition polymer more compatible with the aminoplast crosslinking agent and they help the cure. In water-based coating compositions, the carboxy groups also serve to solubilize the polymer at basic pH values.

The crosslinking reaction between the crosslinking sites of the thermoplastic addition polymer and the aminoplast resin is catalyzed by the presence of a strong acid. Strong acids such as p-toluenesulfonic acid or salts of these acids such as morpholine p-toluenesulfonate, have accordingly been added to accelerate cure. Without the strong acid, the reaction temperatures are often so high and the reaction times so great as to be impractical. Carboxy groups are not acidic enough to allow cure in a reasonable time at 300° F. This is particularly the case with water-based coating systems using water soluble or water dispersible aminoplasts, which are highly etherified. Although aminoplasts containing methylol or other lower alkylol groups can be used in water-based systems, the more usual practice is to use aminoplasts containing methoxymethyl or other lower alkoxymethyl groups to reduce the possibility of aldehyde splitting out. Because the reaction of uncatalyzed highly etherified aminoplasts is sluggish, it is usually necessary to add up to one percent by weight of p-toluenesulfonic acid, a salt of p-toluenesulfonic acid or other highly acid materials to be able to effect a cure at 300° F. in a reasonable time. Although it is not desired to be bound by any theory, it is believed that the strong acid serves to deetherify the aminoplast thereby increasing the overall rate of the crosslinking reaction.

The presence of the strong acid, including the strongly acid salts thereof is undesirable in several respects. For one, the strong acid is detrimental to the compatibility of the thermoplastic addition polymer and the aminoplast crosslinking agent.

For another, the strong acid is detrimental to the water and humidity resistance of the cured film. The strong acid, which is quite water soluble, at least initially, remains in the film upon cure. This provides weak spots in the film which may be attacked by moisture.

It has now been found that the crosslinking reaction between the crosslinking sites of the polymer and the aminoplast resin may be catalyzed by an internal rather than an external strong acid catalyst. An internal catalyst is and remains a part of the thermoplastic acrylic polymer whereas the external catalysts such as p-toluenesulfonic acid are separate molecular species from the polymer.

Accordingly, the present invention contemplates crosslinkable coating compositions having binders consisting essentially of an acrylic interpolymer formed from (1) at least one ethylenically unsaturated monomer having at least one site for crosslinking with an aminoplast resin; (2) at least one ethylenically unsaturated monomer which is free of sites for crosslinking with an aminoplast resin; and (3) at least one ethylenically unsaturated sulfonic monomer represented by the formula:

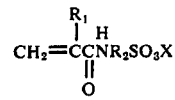

wherein:

$R_1$ is hydro, lower alkyl, lower cycloalkyl, phenyl, furyl, or halo, $R_2$ is a bivalent saturated hydrocarbon radical having its valence bonds on different carbon atoms, and X is hydro, ammonium or amine.

The ethylenically unsaturated monomers having at least one site for crosslinking with an aminoplast resin usually contain from 2 to about 20 carbon atoms. They more often contain from 3 to about 12 carbon atoms. From 3 to 8 carbon atoms is preferred.

Examples of these monomers are hydroxy esters of ethylenically unsaturated acids such as 2-hydroxyethyl butyl maleate, 3-hydroxypropyl methyl maleate, 2-hydroxyethyl fumarate, 2-hydroxypropyl butyl fumarate, 3-hydroxypropyl butyl fumarate, bis-(2-hydroxyethyl) citraconate, bis-(2-hydroxyethyl) mesaconate and 2-hydroxyethyl vinylacetate. The acrylates and α-substituted acrylates are preferred. Examples include 1-hydroxyethyl acrylate, 2-hydroxyethyl acrylate, 1-hydroxypropyl acrylate, 2-hydroxypropyl acrylate, 3-hydroxypropyl acrylate, 2-hydroxy-1-methylethyl acrylate, 1-hydroxybutyl acrylate, 2-hydroxybutyl acrylate, 3-hydroxybutyl acrylate, 4-hydroxybutyl acrylate, 3-hydroxy-1-methylpropyl acrylate, 1-hydroxyethyl methacrylate, 2-hydroxyethyl methacrylate, 1-hydroxypropyl methacrylate, 2-hydroxypropyl methacrylate, 3-hydroxypropyl methacrylate, 1-hydroxybutyl methacrylate, 2-hydroxybutyl methacrylate, 3-hydroxybutyl methacrylate, 4-hydroxybutyl methacrylate, 1-hydroxyethyl ethacrylate, 2-hydroxyethyl ethacrylate, 2-hydroxyethyl ethacrylate, 2-hydroxyethyl ethacrylate, 1-hydroxypropyl ethacrylate, 3-hydroxypropyl ethacrylate, 3-hydroxybutyl ethacrylate, 4-hydroxybutyl ethacrylate, 2-hydroxyethyl α-chloroacrylate, 1-hydroxypropyl α-chloroacrylate, 2-hydroxypropyl α-chloroacrylate, 3-hydroxypropyl α-chloroacrylate, 3-hydroxybutyl α-chloroacrylate, 4-hydroxybutyl α-chloroacrylate, 1,1-dihydroxypropyl acrylate, 1,1-dihydroxypropyl methacrylate, and N-methyl-N-2-hydroxyethylaminoethyl acrylate.

Other examples of ethylenically unsaturated monomers having at least one site for crosslinking with an aminoplast resin are the ethylenically unsaturated acids. These include acrylic acid, methacrylic acid, ethacrylic acid, α-chloroacrylic acid, vinylacetic acid, crotonic acid, tiglic acid, maleic acid, fumaric acid, aconitic acid, itaconic acid, citraconic acid, and mesaconic acid. Acrylic acid and methacrylic acid are preferred.

Primary and secondary amino compounds having ethylenic unsaturation are also usable. Examples are vinylamine, allylamine, 2-aminoethyl acrylate, 2-aminopropyl acrylate, 2-methylaminoethyl acrylate, 2-aminoethyl methacrylate, 3-aminopropyl methacrylate, 2,4-diaminobutyl methacrylate, 2-methylaminoethyl methacrylate, 2-aminoethyl ethacrylate and 2-aminoethyl vinylacetate.

Similarly, ethylenically unsaturated amides are satisfactory for use. Examples are acrylamide, methacrylamide, ethacrylamide, α-chloroacrylamide, vinylacetamide, N-methylacrylamide, N-ethylacrylamide, and N-methylmethacrylamide.

Mercapto compounds having ethylenic unsaturation are also satisfactory. Representative examples are 2-mercaptoethyl acrylate, 3,5-dimercapto acrylate, 2-mercaptoethyl methacrylate, 3-mercaptopropyl methacrylate and 2-mercaptoethyl ethacrylate.

One may employ a single ethylenically unsaturated monomer having at least one site for crosslinking with an aminoplast resin or a plurality of such monomers may be used in sequence or in admixture.

The ethylenically unsaturated monomers which are free of sites for crosslinking with an aminoplast resin usually contain from about 4 to about 20 carbon atoms. They more often contain from 4 to about 12 carbon atoms. From 4 to 8 carbon atoms is preferred.

Examples of these monomers are alkyl esters of ethylenically unsaturated acids such as dimethyl maleate, diethyl maleate, dipropyl maleate, methyl ethyl maleate, ethyl propyl maleate, dimethyl fumarate, diethyl fumarate, dipropyl fumarate, methyl ethyl fumarate, trimethyl aconitate, dimethyl itaconate, dimethyl citraconate, diethyl citraconate, methyl ethyl citraconate, dimethyl mesaconate, diethyl mesaconate, dipropyl mesaconate, methyl ethyl mesaconate, dimethyl muconate, methyl crotonate, ethyl crotonate, propyl crotonate, butyl crotonate, amyl crotonate, hexyl crotonate, 2-ethylhexyl crotonate, methyl tiglate, methyl oleate, ethyl oleate, propyl oleate, methyl erucate and ethyl erucate. Alkyl esters of acids having a plurality of ethylenic unsaturations such as methyl linoleate, methyl linolenate, methyl ricinoleate and methyl sorbate may be used, but their concentration should be kept low enough that the polymer does not lose its thermoplastic characteristics.

The alkyl acrylates and α-substituted alkyl acrylates are preferred. Examples include methyl acrylate, ethyl acrylate, propyl acrylate, isopropyl acrylate, butyl acrylate, isobutyl acrylate, secbutyl acrylate, tert-butyl acrylate, amyl acrylate, neopentyl acrylate, hexyl acrylate, heptyl acrylate, octyl acrylate, 2-ethylhexyl acrylate, nonyl acrylate, decyl acrylate, dodecyl acrylate, methyl methacrylate, ethyl methacrylate, propyl methacrylate, isopropyl methacrylate, butyl methacrylate, isobutyl methacrylate, sec-butyl methacrylate, tert-butyl methacrylate, amyl methacrylate, neopentyl methacrylate, hexyl methacrylate, heptyl methacrylate, octyl methacrylate, 2-ethylhexyl methacrylate, nonyl methacrylate, decyl methacrylate, dodecyl methacrylate, tridecyl methacrylate, hexadecyl methacrylate, methyl ethacrylate, ethyl ethacrylate, propyl ethacrylate, isopropyl ethacrylate, butyl ethacrylate, methyl α-chloroacrylate, ethyl α-chloroacrylate, propyl α-chloroacrylate, butyl α-chloroacrylate, 2-ethylhexyl α-chloroacrylate and octyl α-chloroacrylate. The alkyl esters of acrylic acid and methacrylic acid are preferred. Although only one ethylenically unsaturated monomer which is free of sites for crosslinking with an aminoplast resin may be used, it is preferred to employ a mixture of a plurality of such materials.

The ethylenically unsaturated sulfonic monomers may be represented by the formula

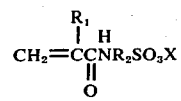

$R_1$ is hydro, lower alkyl, lower cycloalkyl, phenyl, furyl or halo.

When $R_1$ is lower alkyl, it usually contains from 1 to 6 carbon atoms and most often it contains 1 or 2 carbon atoms. When $R_1$ is lower cycloalkyl, it generally contains from 3 to 8 carbon atoms and most often it is cyclohexyl. When $R_1$ is halo, it may be fluoro, chloro, bromo or iodio, but it usually is chloro. It is preferred that $R_1$ be hydro or methyl.

$R_2$ is a bivalent saturated hydrocarbon radical having its valence bonds on different carbon atoms. Usually, $R_2$ contains from 2 to 12 carbon atoms. More often, $R_2$ contains from 2 to 8 carbon atoms. From 2 to 4 carbon atoms is preferred.

X is hydro, ammonium or amine. Illustrative of suitable organic amines one can mention methylamine, dimethylamine, trimethylamine, diethylamine, triethylamine, propylamine, isopropylamine, diisopropylamine, triisopropylamine, butylamine, tributylamine, t-butylamine, 2-methylbutylamine, N-methyl-N-butylamine, di-2-methylbutylamine, trihexylamine, tri-2-ethylhexylamine, didecylamine, tridodecylamine, tri-2-chloroethylamine, di-2-bromoethylamine, methanolamine, ethanolamine, diethanolamine, triethanolamine, methyldiethanolamine, dimethylethanolamine, diethylethanolamine, methyldiethanolimine, isopropanolamine, propanolamine, diisopropanolamine, triisopropanolamine, butylethanolamine, dihexanolamine, 2-methoxyethylamine, di-2-ethoxyethylamine, tri-2-ethoxyethylamine, 2-hydroxyethyldiisopropylamine, 2-aminoethylethanolamine, cyclohexylamine, tricyclohexylamine, trimethylcyclohexylamine, bis-methylcyclopentylamine, N-methyl-N-cyclohexylamine, N-2-ethylhexyl-N-cyclohexylamine, diphenylamine, phenyldimethylamine, methylphenylamine, ditolylamine, trixylylamine, tribenzylamine, triphenethylamine, benzyldimethylamine, benzyldihexylamine, tris-chlorophenethylenimine, N-methylethylenimine, N-cyclohexylethylenimine, piperidine, N-ethylpiperidine, 2-methylpiperidine, 1,2,3,4-tetrahydropyridine, 1,2-dihydropyridine, 2-, 3- and 4-picoline, morpholine, N-methylmorpholine, N-2-hydroxyethylmorpholine, N-2-ethoxyethylmorpholine, piperazine, N-methylpiperazine, N,N'-dimethylpiperazine, and the like. The preferred amines are triethanolamine, morpholine, dimethylethanolamine and diethylethanolamine.

Examples of ethylenically unsaturated acidic monomers which may be used are:
1-acrylamido-1-ethanesulfonic acid
2-acrylamido-1-ethanesulfonic acid
1-acrylamido-1-propanesulfonic acid
2-acrylamido-1-propanesulfonic acid
3-acrylamido-1-propanesulfonic acid
1-acrylamido-2-propanesulfonic acid
2-acrylamido-2-propanesulfonic acid
1-acrylamido-1-butanesulfonic acid
2-acrylamido-1-butanesulfonic acid
3-acrylamido-1-butanesulfonic acid
4-acrylamido-1-butanesulfonic acid 2-acrylamido-2-butanesulfonic acid
3-acrylamido-2-butanesulfonic acid
4-acrylamido-2-butanesulfonic acid
1-acrylamido-2-methyl-1-propanesulfonic acid
2-acrylamido-2-methyl-1-propanesulfonic acid
3-acrylamido-2-methyl-1-propanesulfonic acid
2-acrylamido-1,1-dimethyl-1-ethanesulfonic acid
1-acrylamido-2-butanesulfonic acid
3-acrylamido-1-pentanesulfonic acid
5-acrylamido-1-pentanesulfonic acid
4-acrylamido-2-methyl-1-butanesulfonic acid
4-acrylamido-3-methyl-1-butanesulfonic acid
4-acrylamido-3-methyl-2-butanesulfonic acid
3-acrylamido-2,2-dimethyl-1-propanesulfonic acid
6-acrylamido-1-hexanesulfonic acid
4-acrylamido-2,3-dimethyl-1-butanesulfonic acid
4-acrylamido-2,2-dimethyl-1-butanesulfonic acid
4-acrylamido-2,2-dimethyl-1-butanesulfonic acid
7-acrylamido-1-heptanesulfonic acid
8-acrylamido-1-octanesulfonic acid
1-methacrylamido-1-ethanesulfonic acid
2-methacrylamido-1-ethanesulfonic acid
1-methacrylamido-1-propanesulfonic acid
2-methacrylamido-1-propanesulfonic acid
3-methacrylamido-1-propanesulfonic acid
1-methacrylamido-2-propanesulfonic acid
2-methacrylamido-2-propanesulfonic acid
1-methacrylamido-1-butanesulfonic acid
2-methacrylamido-1-butanesulfonic acid
3-methacrylamido-1-butanesulfonic acid
4-methacrylamido-1-butanesulfonic acid
2-methacrylamido-2-butanesulfonic acid
3-methacrylamido-2-butanesulfonic acid
4-methacrylamido-2-butanesulfonic acid
1-methacrylamido-2-methyl-1-propanesulfonic acid
2-methacrylamido-2-methyl-1-propanesulfonic acid
3-methacrylamido-2-methyl-1-propanesulfonic acid
2-methacrylamido-1,1-dimethyl-1-ethanesulfonic acid
1-methacrylamido-2-butanesulfonic acid
3-methacrylamido-1-pentanesulfonic acid
5-methacrylamido-1-pentanesulfonic acid
4-methacrylamido-2-methyl-1-butanesulfonic acid
4-methacrylamido-3-methyl-1-butanesulfonic acid
4-methacrylamido-3-methyl-2-butanesulfonic acid
3-methacrylamido-2,2-dimethyl-1-propanesulfonic acid
6-methacrylamido-1-hexanesulfonic acid
4-methacrylamido-2,3-dimethyl-1-butanesulfonic acid
4-methacrylamido-2,2-dimethyl-1-butanesulfonic acid
7-methacrylamido-1-heptanesulfonic acid
8-methacrylamido-1-octanesulfonic acid
1-ethacrylamido-1-ethanesulfonic acid
2-ethacrylamido-1-ethanesulfonic acid
1-ethacrylamido-1-propanesulfonic acid
2-ethacrylamido-1-propanesulfonic acid
3-ethacrylamido-1-propanesulfonic acid
2-ethacrylamido-2-methyl-1-propanesulfonic acid
6-ethacrylamido-1-hexanesulfonic acid
8-ethacrylamido-1-octanesulfonic acid
2-hexacrylamido-1-ethanesulfonic acid
2-(α-cyclohexylacrylamido)-1-ethanesulfonic acid
2-(α-cyclohexylacrylamido)-2-methyl-1-propanesulfonic acid
2-atropamido-2-methyl-1-propanesulfonic acid
2-(α-furylacrylamido)-1-ethanesulfonic acid
2-(α-chloroacrylamido)-1-ethanesulfonic acid
2-(α-chloroacrylamido)-2-methyl-1-propanesulfonic acid
2-(α-bromoacrylamido)-1-ethanesulfonic acid
methylamine 1-acrylamido-1-ethanesulfonate
cyclohexylamine 2-acrylamido-1-ethanesulfonate
triethylamine 1-acrylamido-1-propanesulfonate
triisopropanolamine 2-acrylamido-1-propanesulfonate
morpholine 3-acrylamido-1-propanesulfonate
diethanolamine 1-acrylamido-2-propanesulfonate
diethanolamine 2-acrylamido-2-propanesulfonate
diethylamine 1-acrylamido-1-butanesulfonate
N-ethylpiperidine 2-acrylamido-1-butanesulfonate
didecyl 3-acrylamido-1-butanesulfonate
ditolylamine 4-acrylamido-1-butanesulfonate
diethylethanolamine 2-acrylamido-2-butanesulfonate
2-methylpiperidine 3-acrylamido-2-butanesulfonate
piperazine 4-acrylamido-2-butanesulfonate
tert-butylamine 1-acrylamido-2-methyl-1-propanesulfonate
diisopropanolamine 2-acrylamido-2-methyl-1-propanesulfonate
tributylamine 3-acrylamido-2-methyl-1-propanesulfonate
dimethylethanolamine 2-acrylamido-1,1-dimethyl-1-ethanesulfonate
morpholine 1-acrylamido-2-butanesulfonate
triethanolamine 3-acrylamido-1-pentanesulfonate
triethylamine 5-acrylamido-1-pentanesulfonate
triisopropanolamine 4-acrylamido-2-methyl-1-butanesulfonate
2-methylbutylamine 4-acrylamido-3-methyl-1-butanesulfonate
ethanolamine 4-acrylamido-3-methyl-2-butanesulfonate
picoline 3-acrylamido-2,2-dimethyl-1-propanesulfonate
dimethylamine 6-acrylamido-1-hexanesulfonate
N-methylmorpholine 4-acrylamido-2,3-dimethyl-1-butanesulfonate
tribenzylamine 4-acrylamido-2,2-dimethyl-1-butanesulfonate
cyclohexylamine 7-acrylamido-1-heptanesulfonate
isopropanolamine 8-acrylamido-1-octanesulfonate
propylamine 1-methacrylamido-1-ethanesulfonate
2-methoxyethylamine 2-methacrylamido-1-ethanesulfonate
methylphenylamine 1-methacrylamido-1-propanesulfonate
diphenylamine 2-methacrylamido-1-propanesulfonate
tridodecylamine 3-methacrylamido-1-propanesulfonate
triethanolamine 1-methacrylamido-2-propanesulfonate
diethanolamine 2-methacrylamido-2-propanesulfonate
N-methyl-N-cyclohexylamine 1-methacrylamido-1-butanesulfonate
morpholine 2-methacrylamido-1-butanesulfonate
methyldiethanolamine 3-methacrylamido-1-butanesulfonate
butylamine 4-methacrylamido-1-butanesulfonate
didecylamine 4-methacrylamido-2,3-dimethyl-1-butanesulfonate
ethanolamine 4-methacrylamido-2,2-dimethyl-1-butanesulfonate
propylamine 7-methacrylamido-1-heptanesulfonate
morpholine 8-methacrylamido-1-octanesulfonate
propanolamine 1-ethacrylamido-1-ethanesulfonate
diisopropylamine 2-ethacrylamido-1-ethanesulfonate
butylamine 1-ethacrylamido-1-propanesulfonate
diphenylamine 2-ethacrylamido-1-propanesulfonate
triethanolamine 3-ethacrylamido-1-propanesulfonate triethylamine 2-ethacrylamido-2-methyl-1-propanesulfonate
morpholine 6-ethacrylamido-1-hexanesulfonate
triisopropanolamine 8-ethacrylamido-1-octanesulfonate
dimethylethanolamine 2-(α-cyclohexylacrylamido)-1-ethanesulfonate
diisopropanolamine 2-(α-chloroacrylamido)-1-ethanesulfonate
triethanolamine 2-(α-chloroacrylamido)-2-methyl-1-propanesulfonate
ammonium 2-acrylamido-1-ethanesulfonate
ammonium 2-acrylamido-2-methyl-1-propanesulfonate
ammonium 2-methacrylamido-1-ethanesulfonate
ammonium 2-methacrylamido-2-methyl-1-propanesulfonate
ammonium 2-ethacrylamido-1-ethanesulfonate
ammonium 2-ethacrylamido-2-methyl-1-propanesulfonate The preferred ethylenically unsaturated sulfonic monomers are, 2-acrylamido-2-methyl-1-propanesulfonic acid and its amine and ammonium salts.

Generally, only one ethylenically unsaturated sulfonic monomer is used in preparing the acrylic interpolymer although a plurality of ethylenically unsaturated sulfonic monomers may be used either sequentially or in admixture.

The ethylenically unsaturated sulfonic monomers may be prepared by several methods.

The acrylamidoalkanesulfonic acids and α-substituted acrylamidoalkanesulfonic acids may be prepared by reacting acrylyl chloride or α-substituted acrylyl chloride with an aminoalkanesulfonic acid as described in U.S. Pat. No. 2,983,712 and in U.S. Pat. No. 3,332,904. Salts of acrylamidoalkanesulfonic acids and α-substituted acrylamidoalkanesulfonic acids may be prepared by either (1) reacting the acrylamidoalkanesulfonic acid or α-substituted acrylamidoalkanesulfonic acid with the appropriate base or (2) reacting acrylyl chloride or α-substituted acrylyl chloride with salts of hydroxyalkanesulfonic acids, both as described in U.S. Pat. No. 2,983,712 and in U.S. Pat. No. 3,332,904.

Another method for the preparation of acrylamidoalkanesulfonic acids is described in British patent specification No. 1,090,779 and involves the reaction of an olefin, sulfur trioxide and acrylonitrile in one step.

Still another method for the preparation of acrylamidoalkanesulfonic acids and α-substituted acrylamidoalkanesulfonic acids is disclosed by U.S. Pat. No. 3,544,597 which discloses mixing an excess of acrylonitrile or α-substituted acrylonitrile with an olefin at a relatively low temperature, e.g., −30° to 45° C., and adding fuming sulfuric acid to the mixture while maintaining the same temperature range until the reaction is completed.

A two step process is disclosed in U.S. Pat. No. 3,506,707 wherein an olefin is reacted with an acyl hydrogen sulfate to produce a sulfonated intermediate and then reacting the sulfonated intermediate with water and acrylonitrile or α-substituted acrylonitrile.

The interpolymerization of the three classes of monomer is carried out by known addition polymerization techniques, preferably at temperatures in the range of from about 70° to about 150° C. Bulk polymerization can be employed in which the monomers are mixed together with a free radical initiator and reacted at a temperature at which polymerization will occur. Emulsion and suspension polymerization processes can also be employed. These latter processes are carried out in aqueous medium and generally employ free radical initiators, often together with emulsifying or dispersing agents. Solution polymerization can also be used in which case the monomers are dissolved in a suitable solvent and polymerized in the presence of a free radical initiator. Nonaqueous dispersion polymerization is also useful wherein the monomers are dissolved in an organic liquid which is a solvent for the monomers but a non-solvent for the interpolymer. Often a dispersion stabilizer is included with the monomers. A free radical initiator is also used.

The free radical initiators are compounds conventionally used in the art as a source of free radicals for addition polymerizations. Examples are the peroxides such as ethyl peroxide, benzoyl peroxide and dicumyl peroxide, ketone peroxides such as methyl ethyl ketone peroxide, hydroperoxides such as methyl hydroperoxide, acyloins such as benzoin, alkali metal persulfates, alkali metal bisulfites, peracetates such as methyl peracetate and tert-butyl peracetate, peroxalates such as dimethyl peroxalate and di(tert-butyl) peroxalate, disulfides such as dimethyl thiuram disulfide and azo compounds such as α,α'-azobisisobutyronitrile and γ,γ'-azobis (γ-cyanovaleric acid).

The proportions of the various monomers which are interpolymerized to form the acrylic interpolymer may vary widely. The amount of ethylenically unsaturated monomer having at least one site for cross-linking with an aminoplast resin employed is usually in the range of from about 1 to about 50 percent by weight based on the weight of interpolymer. An amount in the range of from about 2 to about 30 percent is typical. From about 5 to about 20 percent is preferred.

The amount of ethylenically unsaturated monomer which is free of sites for cross-linking with an aminoplast resin employed is usually in the range of from about 45 to about 98 percent by weight based on the weight of interpolymer. An amount in the range of from about 65 to about 95 percent is often used. From about 75 to about 90 percent is preferred.

The amount of ethylenically unsaturated sulfonic monomer, which, for purposes of this invention is considered not to fall into either of the two preceeding categories of ethylenically unsaturated monomer, is generally employed in the range of from about 0.25 percent to about 1.5 percent by weight based on the weight of interpolymer.

Crosslinking coating compositions of the invention may be prepared by admixing the acrylic interpolymer described above with an aminoplast resin. Ordinarily, the weight ratio of acrylic interpolymer to aminoplast resin is in the range of from about 97:3 to about 50:50. From about 95:5 to about 60:40 is more often used. From about 90:10 to about 70:30 is preferred.

Other materials such as solvents, non-solvent liquids, emulsifiers, pigments and other additives which are customarily included in coating compositions may be included in the crosslinking coating compositions of this invention. Especially preferred are the water-base compositions. Generally, the binder of the coating compositions of this invention contains from about 25 to about 97 percent by weight acrylic interpolymer described above and about 30 to about 95 percent by weight of aminoplast resin. From about 35 to about 90 percent acrylic interpolymer and from about 1.5 to about 50 percent aminoplast resin are more typical.

From about 2.5 to about 40 percent acrylic interpolymer and from about 5 to about 30 percent aminoplast resin is preferred. The binder usually constitutes from about 5 to about 100 percent by weight of the crosslinkable coating composition. From about 10 to about 80 percent is typical. From about 20 to about 100 percent is preferred.

Examples of aminoplast resins that are useful are the aminealdehyde resins, i.e., an aldehyde condensation product of melamine, urea, acetoguanamine, or a similar compound. Generally, the aldehyde employed is formaldehyde, although the products can be made from other aldehydes, such as acetaldehyde, crotonaldehyde, acrolein, benzaldehyde, furfural, and others. While resins produced from melamine or urea are most common and are preferred, condensation products of other amines and amides can also be employed, for example, those of triazines, diazines, triazoles, guanidines, guanamines, and alkyl and aryl substituted derivatives of such compounds, including alkyl and aryl substituted melamine, provided at least one amino group is present. Some examples of such compounds are urea, N,N'-dimethylurea, benzyl urea, dicyandiamide, formoguanamine, acetoguanamine, benzoguanamine, melamine, ammeline, 2-chloro-4,6-diamino-1,3,5-triazine, 2-phenyl-4-amino-6-hydroxy-1, 3,5,-triazine, 3,5-diaminotriazole, triaminopyrimidine, 2-mercapto-4,6-diaminopyrimidine, 2,4,6-trihydrazine-1,2,5-triazine, 2,4,6-triethyltriamine-1,3,5-triazine, 2,4,6-triphenyltriamino-1,3,5-triazine, and the like.

These aldehyde condensation products contain methylol or similar alkylol groups, the structure of the alkylol group depending upon the particular aldehyde employed. At least a portion, i.e., all or part, of these alkylol groups may be etherified by reaction with an alcohol. Any monohydric alcohol can be employed for this purpose, including such alcohols as methanol, ethanol, propanol, butanol, pentanol, hexanol, heptanol, and other alkanols, usually having up to about 12 carbon atoms, as well as benzyl alcohol and other aromatic alcohols; cyclic alcohols, such as cyclohexanol; monoethers of glycols such as the Cellosolves and carbitols; and halogen-substituted or other substituted alcohols, such as 3-chloropropanol.

The amine-aldehyde resin is produced in a manner well known in the art, using acidic or basic catalysts and varying conditions of time and temperature in accordance with conventional practice. The formaldehyde is often employed as a solution in water or alcohol, and the condensation, etherification and polymerization reactions may be carried out either sequentially or simultaneously.

Some of the preferred aldehyde condensation products of melamine include hexakis (methoxymethyl) melamine, ethylated methylate methylolmelamine, hexylated methylated methylolmelamine, partially or fully butylated methylolmelamine, benzoguanamine and the like.

The crosslinkable coating compositions of the invention can be applied to substrates by ordinary methods of application, as for example, by reverse roll coating, spraying, dipping curtain coating, printing, electrodeposition or by similar conventional techniques. The applied coating may then be baked to form a hard, tough, adherent film.

The baking schedules can vary somewhat depending upon the specific identities and amounts of the various components of the coating composition. Typical baking temperatures are in the range of from about 80° to about 200° C. From about 100° to about 175° C. are frequently employed. From about 120° to about 140° C. are preferred. Generally, baking times are in the range of from about 1 to about 60 minutes. From about 10 to about 40 minutes are typical while from about 15 to about 30 minutes are preferred.

In the illustrative examples which follow, all parts are parts by weight, and percentages are percentages by weight unless otherwise specified.

EXAMPLE I

A first solution is prepared having the following composition:

| | |
|---|---|
| 2-hydroxyethyl acrylate | 214.8 parts |
| styrene | 559.7 |
| n-butyl acrylate | 1104.0 |
| methacrylic acid | 160.0 |
| tert-dodecyl mercaptan | 59.5 |
| α,α'-azobisisobutyronitrile | 12.2 |

A second solution is prepared having the following composition:

| | |
|---|---|
| | 10.2 parts |
| ethyl Cellosolve | 26.5 |
| isopropanol | 30.0 |
| diisopropanol amine | 5.0 |
| ethanol | 30.0 |

A reactor equipped with an agitator, a reflux condenser, a thermometer and a source of nitrogen is charged with 490.0 parts ethyl Cellosolve and 111.2 parts isopropanol. Nitrogen is turned on and heat is applied. Thirty minutes later (temperature 102° C.), drops of reflux are observed to be dripping back into the reactor. After 10 additional minutes (temperature 110° C.), the gradual additions of 2110.2 parts of the first solution and 101.7 parts of the second solution are begun. Three hours later (temperature 114° C.), the additions are completed and 3.3 parts tert-butyl perbenzoate and 7.4 parts ethyl Cellosolve are added. The reaction mixture is held at 114° C. for 1 hour and an additional 3.3 parts tert-butyl perbenzoate and 7.4 parts ethyl Cellosolve are added. The reaction mixture is held at 114° C. for 1 hour and still an additional 3.3 parts tert-butyl perbenzoate and 7.4 parts ethyl Cellosolve are added. The reaction mixture is held at 114° C. for 2 hours. Cooling is begun and 102.0 parts diisopropanol amine is added over a period of 5 minutes. Upon completion of this addition, the temperature is 103° C. Five minutes later (temperature 100° C.), the addition of 365.0 parts hexakis (methoxymethyl) melamine is begun. Five minutes later the addition is completed. The resulting resin composition is cooled to room temperature.

A third solution is prepared having the following composition:

| | |
|---|---|
| methacrylic acid | 55.1 parts |
| styrene | 75.8 |
| butyl acrylate | 213.0 |
| di-tert-butyl peroxide | 3.4 |
| cumene hydroperoxide | 3.4 |
| tert-dodecyl mercaptan | 10.3 |

A reactor equipped with an agitator, a reflux condenser, a thermometer and a source of nitrogen is charged with 35.6 parts butyl Cellosolve and 35.6 parts of the above third solution. Nitrogen is turned on and heat is applied. Seventy minutes later (temperature 290° F.), the gradual addition of 325.4 parts of the above third solution is begun. Three hours later (temperature 305° F.), the addition is completed and 0.805 parts di-tert-butyl peroxide and 1.3 parts butyl Cellosolve are added. The reaction mixture is held in the range of 278° to 280° F for 2 hours and then 0.805 parts di-tert-butyl peroxide and 1.3 parts butyl Cellosolve are added. The reaction mixture is held in the range of 278° to 280° F. for two hours and then cooling is begun. Eighty-five minutes later (temperature 220° F.), 50.8 parts n-butanol is added. Two hours later (temperature 120° F.), the resulting intermediate composition is discharged from the reactor.

Diisopropanolamine in the amount of 39.04 parts is heated to 130° F. and added to a mixture of 137.25 parts of the above intermediate composition and 27.40 parts hexakis (methoxymethyl) melamine and milled in a Cowles mill for 15 minutes. Deionized water in the amount of 449.63 parts is slowly added to the mill. Milling is continued for 15 minutes. Next 109.82 parts China clay pigment (aluminum silicate), 384.38 parts titanium dioxide pigment and 54.91 parts wax coated hydrogel silica having an average particle size of about 7 microns (Syloid 161; W. R. Grace & Co.). The components are ground into an intermediate paste and washed out of the mill with 23.10 parts deionized water. The intermediate paste and the wash water are blended to form a pigment paste.

A coating composition is prepared by admixing 327 parts of the above resin composition, 5.6 parts diisopropanolamine, 279 parts of the above pigment paste and 3138.4 parts deionized water.

The coating composition is placed in an electrodeposition tank and a direct current potential is applied to a stainless steel cathode and either a 24 gauge iron phosphate treated cold rolled steel anode (Type A anode) or a 24 gauge zinc phosphate treated cold rolled steel anode (Type B anode) to electrodeposit a film on the anode. The coated anode is then baked at an elevated temperature to crosslink the coating into a hard, infusible film. The crosslinked coating is tested for pencil hardness and sometimes for thickness. The operating conditions and results observed are shown in Table I.

Table 1

| Electrodeposition and Crosslinking of Films Containing Interpolymerized 2-Acrylamido-2-Methylpropanesulfonic Acid | | | | |
| --- | --- | --- | --- | --- |
| Run Number | 1 | 2 | 3 | 4 |
| Type Anode | A | A | B | B |
| Bath Temperature, ° F | 80 | 80 | 80 | 80 |
| Applied Potential, volts | 200 | 200 | 230 | 230 |
| Maximum Current, amperes | 1.5 | 1.5 | 1.3 | 1.0 |
| Electrodeposition Time, seconds | 90 | 90 | 90 | 90 |
| Current at Finish, amperes | 0.13 | — | 0.15 | 0.15 |
| Baking Schedule | | | | |
| Time, minutes | 20 | 30 | 30 | 20 |
| Temperature, ° F | 250 | 250 | 250 | 250 |
| Dry Film Thickness, mils | 1.0 | — | — | 1.0 |
| Pencil Hardness | H | H | H | H |

EXAMPLE II

A solution is prepared having the following composition:

| linseed oil | 4800 parts |
| --- | --- |
| maleic anhydride | 1200 |
| xylene | 2160 |

A reactor equipped with an agitator, a condenser, a thermometer and a source of nitrogen is charged with the above solution. The condenser is set for total reflux and a nitrogen blanket and heat are applied. Twenty minutes later (temperature 150° F), the nitrogen is turned off. One hour and 55 minutes later (temperature 400° F), reflux is observed. After refluxing for 1 hour, the temperature rises to 455° F and distillation is begun. Ninety minutes later (temperature 500° F), a nitrogen sparge is begun. The temperature is held at 500° F for 1 hour. Fifteen minutes later (temperature 450° F), the reaction product is dropped into a thinning reactor and a nitrogen blanket is applied. Two hours later (temperature 120° F), 170 parts diethyl amine is added. One hour later (temperature 120° F), heat is applied. Two hours later (temperature 170° F), the resin product is dispersed into containers and allowed to cool to room temperature.

A pigment paste is prepared by admixing 3.24 parts of the above resin product, 0.55 parts diethyl amine, 5.7 parts deionized water, 10.59 parts titanium dioxide pigment, 0.07 parts phthalo blue pigment (Bahama Blue BA-4555; Standard Ultramarine), 0.27 parts carbon black, 3.15 parts aluminum silicate pigment, 0.95 parts strontium chromate pigment, 0.63 parts lead silicate and 0.243 parts wax having a particle size less than 3 microns (Super Micron Mekon; Western Petrochemical).

A coating composition is prepared by admixing 491 parts of the resin composition of Example I, about 22 parts diisopropanolamine, 51.3 parts of the above pigment paste and 3100 parts deionized water. The coating composition is diluted by adding one-half percent by volume butyl Cellosolve.

The diluted coating composition having a temperature of 80° F is placed in an electrodeposition tank and a direct current potential of 220 volts is applied to a stainless steel cathode and a 24 gauge iron phosphate treated cold rolled steel anode for 90 seconds to electrodeposit a film on the anode. The coated anode is then baked for 30 minutes at 280° F to crosslink the coating into a hard, infusible film. The dry film thickness is about 1.1 to about 1.2 mils.

EXAMPLE III

A reactor equipped with a reflux condenser, agitator, thermometer and reactant and nitrogen inlets is charged with 279 parts ethyl Cellosolve. A nitrogen blanket is applied and the ethyl Cellosolve is brought to reflux (temperature 250° F.). Over a three-hour period 151.2 parts 2-hydroxyethyl acrylate, 200.4 parts acrylic acid, 447.0 parts styrene, 280.2 parts 2-ethylhexyl acrylate, 244.8 parts methyl methacrylate, 266.4 parts butyl methacrylate, 17.0 parts tert-dodecyl mercaptan and 6.55 parts α,α'-azobisisobutyronitrile are added to the reactor. Upon completion of the addition (temperature 275° F.), 13.8 parts ethyl Cellosolve is added over a five minute period. At the end of this period (temperature 285° F.), the addition of 72.0 parts ethyl Cellosolve and 5.04 parts α,α'-azobisisobutyronitrile is begun. Two hours later the addition is completed. The reaction mixture is then held in the range of 280°–288° F. for one hour and cooling is begun. One hour later (temperature 250° F.) 118.8 parts N,N-dimethylethanolamine is added. At the end of another hour (temperature 235° F.) the addition of 529.8 parts hexakis (methoxymethyl) melamine is begun. Ten minutes later (temperature 220° F.) the addition is completed. Thirty minutes later (temperature 220° F.) 372 parts deionized water preheated to 160°–180° F. is added over a thirty minute period. Upon completion of the addition (temperature 200° F.), the reaction mixture is dropped into a thinning tank containing 2592 parts deionized water preheated to 160° F. One hour later (temperature 180° F.) the drop is completed and 300 parts deionized water preheated to 160°–180° F. is added to the reactor as a rinse and dropped into the thinning tank. The temperature is then reduced from 170° to 165° F. over a period of 1 hour. At that time 140 parts deionized water is added. The temperature is reduced from 165° to 160° F. over a period of 1 hour and held at 160° F. for 3 hours. One hundred parts deionized water is then added and the resulting water reducible acrylic composition is cooled to 100° F- filled into containers and cooled to room temperature.

The following materials a admixed: 488.04 parts of the above water reducible acrylic composition, 2.67 parts antifoamer (Nopco JMY; Diamond Shamrock) and 199.56 parts deionized water. To this mixture is added with agitation 89.07 parts phthalo blue (BT-425-D; DuPont). The resulting composition is ground in a steel ball mill. Then 111.33 parts deionized water is added and the mill is rinsed with the resulting first intermediate composition.

The following materials are admixed: 615.89 parts of the above water reducible acrylic composition, 3.15 parts Nopco JMY antifoamer, 112.40 parts deionized water. To this mixture is added with agitation 89.92 parts quinacridone pigment (Montral Magenta RT-203-D; DuPont). The resulting composition is ground in a steel ball mill. Then 77.83 parts deionized water is added and the mill is rinsed with the resulting second intermediate composition.

A pigment paste is prepared by admixing 328 parts of the above first intermediate composition and 110 parts of the above second intermediate composition.

The following materials are admixed: 384.30 parts of the above water reducible acrylic composition, 16.05 parts stabilizer (VC3-419; Mobil Chemical Co.) and 141.48 parts deionized water. To this mixture is added with agitation 461.56 parts acid resistant aluminum paste (LSA-618; Reynolds Metals) to form a third intermediate composition.

A first solution is prepared having the following composition:

| | |
|---|---|
| 2-hydroxyethyl acrylate | 256.5 parts |
| acrylic acid | 162.0 |
| methyl methacrylate | 459.0 |
| n-butyl methacrylate | 499.0 |
| styrene | 810.0 |
| n-butyl acrylate | 513.0 |
| $\alpha,\alpha'$-azobisisobutyronitrile | 27.0 |
| mercaptoethanol | 13.5 |

A second solution is prepared having the following composition:

| | |
|---|---|
| 2-acrylamido-2-methylpropanesulfonic acid | 13.5 parts |
| n-butyl carbitol | 23.5 |
| N,N-dimethylethanolamine | 4.4 |
| ethanol | 25.0 |

A reactor equipped with an agitator, a reflux condenser, a thermometer and a source of nitrogen is charged with 473.5 parts n-butyl carbitol and 547.0 parts of the first solution. Nitrogen is turned on and heat is applied. After 35 minutes, exothermic reaction is observed (temperature 125° C.). Heat is removed and a stream of air is used to cool the outside of the reactor. The temperature reaches a maximum of 132° C. Ten minutes later (temperature 125° C.) the gradual additions of 2193.0 parts of the first solution and 66.4 parts of the second solution are begun. Heat is applied as necessary to hold the temperature to about 125° C. The additions are completed 2-½ hours later (temperature 125° C.) and the gradual addition of 13.0 parts acetone, 30.0 parts of n-butyl carbitol and 2.7 parts $\alpha,\alpha'$-azobisisobutyronitrile is begun. Two hours later (temperature 125° C.) the addition is completed and the reaction mixture is held for one hour. At the end of the holding period (temperature 122° C.) heat is removed. Ten minutes later (temperature 119° C.) the addition of 120.2 parts of N,N-dimethylethanolamine is begun. Fifteen minutes later (temperature 100° C.) the addition is completed and the addition of 900.0 parts hexakis (methoxymethyl) melamine is begun. Ten minutes later (temperature 93° C.) the addition is completed and 1000 parts of deionized water which has been heated to 75° C. is added. Twenty minutes later (temperature 87° C.) the reaction mixture is added to 4000 parts of deionized water heated to 75° C. The reactor is rinsed with 650 parts of deionized water which has been heated to 85° C. The rinse water from the reactor is added to the diluted reaction mixture. After mixing, the resulting mixture is transferred to a reactor and heat is applied to maintain the temperature in the range of from 72° to 74° C. for three hours. The resulting fourth intermediate composition is then cooled to room temperature.

A fifth intermediate composition is prepared by admixing 22 parts of the above pigment paste, 30 parts of the above third intermediate composition, 777 parts of the above fourth intermediate composition and 7 parts deionized water.

A coating composition is prepared by reducing the viscosity of the above fifth intermediate composition with deionized water to a 40 second viscosity using a No. 2 Fisher cup. A steel substrate was sprayed with three coats using an automatic spraying machine. The coated substrate is prebaked at 180° F. for 15 minutes and then baked at 310° F. for 25 minutes. The coating exhibited excellent cure and gloss with little or no orange peel, few craters and only slight sagging.

EXAMPLE IV

A first solution is prepared having the following composition:

| | |
|---|---|
| 2-hydroxyethyl acrylate | 270.5 parts |
| acrylic acid | 171.0 |
| styrene | 855.0 |
| 2-ethylhexyl acrylate | 541.0 |

| | |
|---|---|
| methyl methacrylate | 484.5 |
| n-butyl methacrylate | 513.0 |
| tert-dodecyl mercaptan | 32.5 |
| α,α'-azobisisobutyronitrile | 11.7 |

A second solution is prepared having the following composition:

| | |
|---|---|
| ethyl Cellosolve | 60.0 parts |
| 2-acrylamido-2-methylpropanesulfonic acid | 14.0 |
| N,N-dimethylethanolamine | 4.5 |

A reactor equipped with an agitator, a reflux condenser, a thermometer and a source of nitrogen is charged with 450.0 parts ethyl Cellosolve and 570.0 parts of the first solution. Nitrogen is turned on and heat is applied. After 20 minutes, exothermic reaction is observed (temperature 102° C.). Ten minutes later (temperature 120° C.) the gradual additions of 2309.2 parts of the first solution and 78.5 parts of the second solution are begun. The additions are completed 2-½ hours later (temperature 140° C.) and the gradual addition of 154.0 parts ethyl Cellosolve and 9.0 parts α,α'-azobisisobutyronitrile is begun. Two hours later (temperature 138° C.) the addition is completed and the reaction mixture is held for an additional two-hour period. At the completion of the holding period (temperature 141° C.) heat is removed. Ten minutes later (temperature 120° C.) the addition of 123.5 parts N,N-dimethylethanolamine is begun. Fifteen minutes later (temperature 107° C.) the addition is completed and the addition of 949.5 parts hexakis (methoxymethyl) melamine is begun. Seven minutes later (temperature 92° C.) the addition is completed and the reaction mixture is stirred for three minutes. The reaction mixture is then added to 4500 parts of deionized water which has been heated to 70° C. The reactor is rinsed with 776 parts of deionized water which has been preheated to 80° C. The rinse water from the reactor is added to the diluted reaction mixture. The resulting composition is split into two equal portions. One portion is held at a temperature in the range of from 72° to 74° C. for about six hours and then cooled. To this cooled portion is added 100 parts deionized water to form a first intermediate composition.

A water reducible acrylic composition is prepared as in Example III except that 21 parts tert-dodecyl mercaptan is employed.

A first pigment paste is prepared by milling 600.0 parts of the above water reducible acrylic composition, 100 parts phthalocyanine blue pigment (Cyan Blue BNS 55–3750; American Cyanamid), 6.0 parts Nopco JMY antifoamer and 60.0 parts deionized water.

A second pigment paste is prepared by admixing 298.0 parts of the above water reducible acrylic composition and 87.0 parts acid resistant aluminum flake pigment containing approximately 65 percent aluminum (Alcoa 726; Aluminum Corp. of America).

A third pigment paste is prepared by admixing 92.5 parts of the above first pigment paste, 613.5 parts of the above second pigment paste and 60.0 parts deionized water.

A reducing solution is prepared by blending 100 parts by volume butyl carbitol and 100 parts by volume deionized water.

A coating composition is prepared by admixing 17.2 parts of the above third pigment paste, 264.0 parts of the above first intermediate composition, 20.0 parts of the above reducing solution and 15.0 parts deionized water.

Three coats of the above coating composition, sprayed onto a metal panel and baked in an oven having a temperature increasing from about 160° F. to about 330° F. for 30 minutes, provide a hard, infusible coating having a 20° gloss of 80, few craters and very good resistance to xylene.

We claim:
1. A crosslinkable coating composition free of external strong acid catalyst and having a binder consisting essentially of
   a. an acrylic interpolymer formed from
      1. an amount of a plurality of ethylenically unsaturated monomers having at least one site for crosslinking with an aminoplast resin in the rane of from about 1 to about 50 percent by weight based on the weight of said interpolymer, said monomers comprising
         a. hydroxy ester of ethylenically unsaturated monocarboxylic acid, and
         b. acrylic acid or methacrylic acid;
      2. an amount of ethylenically unsaturated monomer which is free of sites for crosslinking with an aminoplast resin in the range of from about 45 to about 98 percent by weight based on the weight of said interpolymer;
      3. an amount of at least one ethylenically unsaturated sulfonic monomer represented by the formula

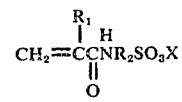

wherein
   $R_1$ is hydro, lower alkyl, lower cycloalkyl, phenyl, furyl or halo,
   $R_2$ is a bivalent saturated hydrocarbon radical having its valence bonds on different carbon atoms,
   X is hydro, ammonium or amine, in the range of from about 0.25 to about 1.5 percent by weight based on the weight of said interpolymer; and
   b. an aminoplast resin wherein,
   c. said binder constitutes from about 5 to about 100 percent by weight of said crosslinkable coating composition;
   d. said binder contains from about 25 to about 97 percent by weight of said acrylic interpolymer; and
   e. said binder contains from about 30 to about 95 percent by weight of said aminoplast resin.

2. The crosslinkable coating composition of claim 1 wherein:
   a. said ethylenically unsaturated monomers having at least one site for crosslinking with an aminoplast resin contains from 3 to about 12 carbon atoms; and
   b. said ethylenically unsaturated monomer which is free of sites for crosslinking with said aminoplast resin contains from about 4 to about 20 carbon atoms.

3. The crosslinkable coating composition of claim 1 wherein said hydroxy ester of ethylenically unsaturated acid is a hydroxy-containing acrylate or a hydroxy-containing α-substituted acrylate.

4. The crosslinkable coating composition of claim 1 wherein said ethylenically unsaturated monomer which is free of sites for crosslinking with an aminoplast resin is selected from the group consisting of alkyl acrylate and alkyl methacrylate.

5. The crosslinkable coating composition of claim 1 wherein said ethylenically unsaturated sulfonic monomer is represented by the formula

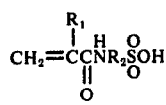

wherein
$R_1$ is hydro or lower alkyl having from 1 to 2 carbon atoms, and
$R_2$ is a bivalent saturated hydrocarbon radical having from 2 to 8 carbon atoms and having its valence bonds on different carbon atoms.

6. The crosslinkable coating composition of claim 5 wherein $R_1$ is hydro or methyl and wherein $R_2$ is a bivalent saturated hydrocarbon radical having from 2 to 4 carbon atoms.

7. The crosslinkable coating composition of claim 1 wherein said ethylenically unsaturated sulfonic monomer is 2-acrylamido-2-methylpropanesulfonic acid.

8. The crosslinkable coating composition of claim 1 wherein said aminoplast resin is an aldehyde condensation product of melamine.

9. The crosslinkable coating composition of claim 1 wherein said aminoplast is hexakis (methoxymethyl) melamine.

10. The crosslinkable coating composition of claim 7 wherein said aminoplast is hexakis (methoxymethyl) melamine.

11. A method comprising heating the crosslinkable coating composition of claim 1 at an elevated temperature until crosslinked to the hard, infusible state.

12. The method of claim 11 wherein said elevated temperature is in the range of from about 80° to about 200° C.

* * * * *

UNITED STATES PATENT AND TRADEMARK OFFICE
CERTIFICATE OF CORRECTION

PATENT NO. : 4,008,293
DATED : February 15, 1977
INVENTOR(S) : Rudolf Maska and Donald P. Hart It is certified that error appears in the above-identified patent and that said Letters Patent are hereby corrected as shown below:

Column 10, line 26, insert --2-acrylamido-2-methylpropanesulfonic acid-- before "10.2 parts".

Signed and Sealed this

Seventeenth Day of May 1977

[SEAL]

Attest:

RUTH C. MASON
*Attesting Officer*

C. MARSHALL DANN
*Commissioner of Patents and Trademarks*